US006291957B1

(12) United States Patent
Hopson et al.

(10) Patent No.: US 6,291,957 B1
(45) Date of Patent: Sep. 18, 2001

(54) OBSTRUCTION SENSING UTILIZING LATERAL FORCES ON A MOVING WINDOW

(75) Inventors: Charles Hopson, Lebanon; Timothy Davies, Hermitage, both of TN (US); Joseph Tyckowski, Clawson; Christos Kyrtsos, Southfield, both of MI (US); Francois Breynaert, Caen; Pascal Bonduel, Bouzy la Foret, both of (FR)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/430,089

(22) Filed: Oct. 29, 1999

(Under 37 CFR 1.47)

(51) Int. Cl.[7] .......................... H02P 1/04

(52) U.S. Cl. .......................... 318/466; 318/282; 49/28

(58) Field of Search .......................... 318/280–286, 318/466, 468, 260–266, 256; 49/26–28

(56) References Cited

U.S. PATENT DOCUMENTS 3,069,152 * 12/1962 Arlauskas et al. .................. 268/124
3,465,476 * 9/1969 Rayner .................. 49/28
3,581,174 * 5/1971 Hammer .................. 318/266
3,591,982 * 7/1971 Nantau .................. 49/227
3,702,041 * 11/1972 Podolan .................. 49/348
4,580,074 * 4/1986 Gilman .................. 310/339
4,621,223 * 11/1986 Murakami et al. .................. 318/282
4,631,461 * 12/1986 Peugeot .................. 318/280
4,943,757 * 7/1990 Richter .................. 318/468
5,592,060 * 1/1997 Racine et al. .................. 318/469
6,002,227 * 12/1999 Lamm et al. .................. 318/468

FOREIGN PATENT DOCUMENTS

560047-A-1 * 9/1993 (DE) .................. 49/28
2158149-A * 11/1985 (GB) .................. 49/26
05071269-A * 3/1993 (JP) .................. 49/28

* cited by examiner

*Primary Examiner*—Robert E. Nappi
*Assistant Examiner*—Rina I. Duda
(74) *Attorney, Agent, or Firm*—Carlson, Gaskey, & Olds

(57) ABSTRACT

A vehicle window obstruction detection system looks for lateral forces on the window. A lateral force is indicative of an obstruction in the path of the window, and is particularly indicative of a living obstruction. The presence of the lateral force is utilized to identify an obstruction, and stop further movement of the movable closure.

10 Claims, 1 Drawing Sheet

OBSTRUCTION SENSING UTILIZING LATERAL FORCES ON A MOVING WINDOW

BACKGROUND OF THE INVENTION

This invention relates to monitoring lateral forces on a window to determine the presence of an obstruction in the path of the window.

Modern vehicles typically have several windows which are movable automatically. In this application, the term "window" should be understood to include not only side windows in a vehicle, but also other movable closures such as rear windows, sunroofs, etc.

Typically in the prior art, a switch may be actuated and the window will then close automatically. There may sometimes be an obstruction in the way of the window, As an example, a passenger's arm may extend outwardly of the window opening when the window is being closed.

The prior art has attempted to identify such obstructions by monitoring current or torque load on the motor. When a particular characteristic of the load on the motor is seen, an indication is made that an obstruction has been encountered.

It is desirable to provide an obstruction indicator which is more directly related to the window and contact with an obstruction.

SUMMARY OF THE INVENTION

In a disclosed embodiment of the this invention, a sensor monitors lateral forces on a moving window. A lateral force is indicative of an obstruction being in contact with the window. As an example, if a passenger in a vehicle has an arm trapped in the path of the window, the arm will tend to be pulled in, as contact is initiated. This creates a lateral force on the window. By monitoring lateral forces on the window, the present invention is able to identify the presence of an obstruction. If an obstruction has been identified, then the motor for the window may be stopped or reversed.

In one disclosed embodiment, a sensor is incorporated into the structure which holds the window. In a first embodiment, the sensor may be a piezoelectric material. This material is sensitive to force and vibration, and thus would be able to identify even a small lateral force being applied to the window. In a second embodiment, an accelerometer may be placed on the structure which holds the window. This accelerometer would be able to identify the existence of the lateral force.

In a distinct embodiment, a piezoelectric film is incorporated into the seal for the window. As the window encounters the lateral force, the window would tend to twist within its seal. This would apply a force to the piezoelectric lining.

With any of the above embodiments, the control monitors signals from the sensors, and identifies an obstruction by evaluating lateral forces. When an obstruction has been identified, the control sends a signal to the motor to either reverse or stop further movement.

These and other features of the present invention will be best understood from the following specification and drawings.

DETAILED DESCRIPTION OF A PREFERRED EMBODIMENT

Figure 1:
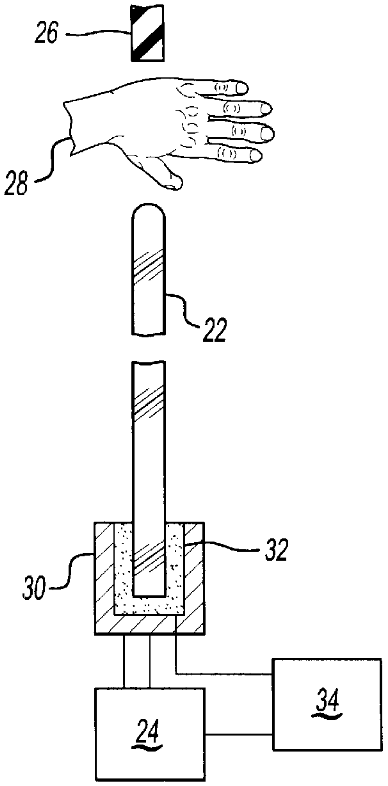
FIG. 1 is a schematic view of a first embodiment of this invention.

A window 20 is illustrated in FIG. 1 having a moving closure member 22 driven by a motor 24, shown schematically. At a closed position window 22 is received in an upper frame seal 26. At times, a passenger may have an arm 28 in the path of the moving closure 22. As known, the motor 24 may be actuated by an operator switch to close automatically. If the closure 22 is moving towards a closed position, it can trap and pinch the passenger 28.

The present invention identifies the existence of an obstruction at a connection 30 which holds and moves the closure 22. The connection between motor 24 and holder 30 is shown schematically. Any such connection, and any holding structure would come within the scope of this invention. The present invention incorporates a material which is sensitive to force on the closure 22 into the connector 30. In a preferred embodiment, the material 32 is a piezoelectric material. The piezoelectric material is sensitive to force on the closure 22, and will be able to identify a lateral force.

If material 32 senses a lateral force, a signal is sent to a control 34. Upon detection of the lateral force, control 34 controls the motor 24 to either reverse or stop movement of the closure 22. In this way, the obstruction 28 will not be trapped between the moving closure 22 and the frame 26. Of course, if some lateral forces are to be expected the control 34 can be made sensitive to unexpected lateral forces.

Figure 2:
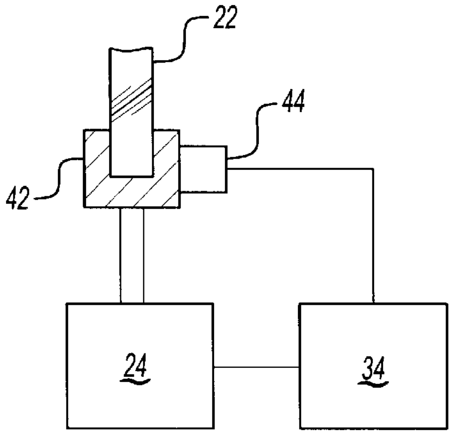
FIG. 2 is a schematic of a second view of this invention.

FIG. 2 shows another embodiment 40 wherein the holding structure 42 carries an accelerometer 44. Accelerometer 44 communicates a signal indicative of a lateral force on the moving closure 22 to a control 34. This embodiment operates as the first embodiment.

Figure 3:
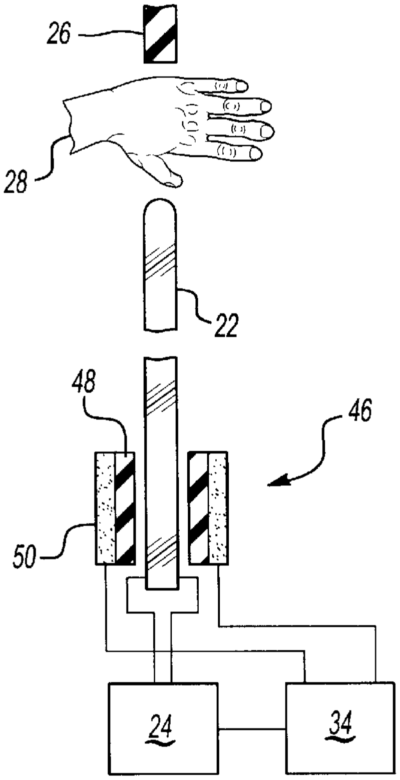
FIG. 3 is a schematic view of a third embodiment.

FIG. 3 shows another embodiment 46. Embodiment 46 includes a seal 48 at a lower end of the closure 22. A piezoelectric film 50 is placed outwardly of the seal material 48. The obstruction 28 on the moving closure 22 will cause a lateral force which can be sensed by the film 50, as the closure 22 bends within the seal 48. As with the earlier embodiments, this lateral force can be conveyed to the control 34 which then controls the motor 24.

Although a preferred embodiment of this invention has been disclosed, a worker in this art would recognize that certain modifications would come within the scope of this invention For that reason, the following claims should be studied to determine the true scope and content of this invention.

What is claimed is:

1. A method of identifying an obstruction in a closure comprising the steps of:

(1) providing a movable closure with a sensor for monitoring forces on said closure in a lateral direction generally transverse to a closing direction of movement of said movable closure;

(2) monitoring lateral forces on said closure as said closure is being moved to a closed position, and providing a signal of any monitored lateral forces to a control;

(3) moving said closure towards a closed position; and (4) identifying an obstruction should a lateral force be monitored during closing movement.

2. A method as set forth in claim 1, wherein said monitoring of lateral forces is performed by a sensor incorporated into a window seal.

3. A method as set forth in claim 1, wherein said monitoring of lateral forces is performed by a sensor mounted within a holding structure for holding said closure.

4. A vehicle closure assembly comprising:

a movable closure which is movable relative to a vehicle frame;

a linkage for moving said closure to a closed position;

a motor for closing said movable closure; and a lateral force sensor for sensing lateral forces on said closure as said closure is moved to a closed position, and a control for identifying a sensed lateral force on said closure and indicating the presence of an obstruction in the path of said closure.

5. An apparatus as set forth in claim 4, wherein said closure is stopped if an obstruction is identified.

6. An assembly as set forth in claim 4, wherein said motor is reversed if an obstruction is identified.

7. An assembly as set forth in claim 5, wherein said sensor is incorporated into a seal for guiding and sealing said movable closure.

8. An assembly as set forth in claim 7, wherein said sensor is a piezoelectric film placed adjacent to said seal.

9. An assembly as set forth in claim 5, wherein said sensor incorporates a member mounted adjacent to a holding structure for connecting said linkage to said window.

10. As assembly as set forth in claim 6, wherein said sensor is a piezoelectric element.

* * * * *